United States Patent [19]

Mani et al.

[11] 4,390,402

[45] Jun. 28, 1983

[54] PROCESS FOR REGENERATING SPENT SEED MATERIALS USED IN MAGNETOHYDRODYNAMIC POWER GENERATION

[75] Inventors: Krishnamurthy N. Mani, Denville; Frederick P. Chlanda, Rockaway, both of N.J.

[73] Assignee: Allied Corporation, Morristown, N.J.

[21] Appl. No.: 337,801

[22] Filed: Jan. 7, 1982

[51] Int. Cl.³ .............................................. B01D 57/02
[52] U.S. Cl. ............................. 204/180 P; 204/180 R
[58] Field of Search ........................ 204/180 P, 180 R

[56] References Cited

U.S. PATENT DOCUMENTS 3,657,104 4/1972 Hodgdon ......................... 204/180 P
4,107,015 8/1978 Chlanda et al. ................. 204/180 P
4,219,396 8/1980 Gancy et al. .................... 204/180 P
4,238,305 12/1980 Gancy et al. .................... 204/180 P

*Primary Examiner*—Arthur P. Demers
*Attorney, Agent, or Firm*—Gerhard H. Fuchs; Thomas D. Hoffman; Richard C. Stewart

[57] ABSTRACT

A process for regenerating spent seed materials used in magnetohydrodynamic power generation, such materials comprising an alkali metal carbonate and an alkali metal sulfate as the contaminant which process comprises the steps of introducing an aqueous solution of the spent seed materials into the acid zone of an electrodialysis cell, introducing an aqueous solution of carbon dioxide, an alkali metal carbonate, an alkalimetal bicarbonate or mixture thereof into the base zone of the cell, and thereafter passing a direct current through the cell producing an alkali metal carbonate in the base zone and an alkali metal bisulfate or sulfuric acid in the acid zone.

18 Claims, 3 Drawing Figures

PROCESS FOR REGENERATING SPENT SEED MATERIALS USED IN MAGNETOHYDRODYNAMIC POWER GENERATION

BACKGROUND OF THE INVENTION

1. Field of the Invention

This invention relates to a process for regenerating spent seed materials used in magnetohydrodynamic (MHD) power generation. More particularly, this invention relates to an electrodialysis process for regeneration of spent potassium carbonate seed from mixtures of the carbonate seed and potassium sulfate.

2. Brief Description of the Prior Art

Magnetohydrodynamic (MHD) power generation is based on the direct conversion of heat to electricity by passing a high-temperature, high-velocity, electrically conducting working fluid through a magnetic field. In a coal-fired, open-cycle MHD system (OCMHD), the working fluid is obtained by combusting the coal and seeding the combustion gases with easily-ionizable seed material such as potassium and cesium salt. In a combined cycle power plant with an MHD topping system and a conventional steam turbine bottoming cycle, preheated compressed air and coal are burned in a fuel-rich environment under pressure and at very high temperature in the combustor. The seed is injected and the combustion gas/seed mixture is fed into the MHD channel; there, the interaction of the magnetic field and the ionized plasma results in an induced voltage that is tapped by electrodes, producing DC electrical power, which can then be converted to AC power. Combustion gases then pass through a diffuser, where the kinetic energy is converted to pressure. Exhaust gases leave the MHD generator-diffuser at 2200° to 2300° K. The residual heat must be utilized to produce high-pressure steam and to preheat combustion air. In a typical concept of an MHD steam bottoming plant, the combustion gas is passed through a refractory-lined radiant boiler, where the gas is cooled slowly, to reduce $NO_x$ to an acceptable level before additional air is added and combustion is completed. Combustion gases then flow through a series of heat exchangers, in which the saturated steam produced in the boiler is superheated, air for the primary combustor is heated above 1000 K., and boiler feedwater is heated. Most of the entrained seed is deposited on these heat exchangers as $K_2SO_4$, but control devices must be employed to remove the remaining seed material and fly ash particles in the stack gas.

In addition to having higher efficiency than other fossil-fueled power systems, the OCMHD power system has the advantage of a self-contained sulfur-removal capability. Potassium salts, which are the generally preferred seed material, increase the electrical conductivity of the hot combustion gases by thermal ionization, and can remove $SO_2$ from the gaseous effluent. It has been shown experimentally that sulfur oxide levels produced by the combustion of high sulfur coals can be lowered to environmentally acceptable levels. The spent seed is collected in various downstream components, predominantly as a mixture of water-soluble salts, $K_2CO_3$ and $K_2SO_4$, contaminated with fly ash and other impurities.

Because of the high cost of seed and the large quantities of seed required, a sulfur removal technique in which the $K_2SO_4$ is disposed of and is not reprocessed and reused in MHD plant is possible only if there is an adequate supply of $K_2CO_3$ and sufficient demand for $K_2SO_4$. At present, it is not economically feasible to consider such a system. Therefore, to exploit the desulfurization capability of the MHD seed material, sufficient quantities of sulfur must be separated from the recovered $K_2SO_4$ so that the seed can be reused.

While there is no established seed recovery process, various methods have been proposed for regeneration of spent potassium carbonate seed from coal fired magnetohydrohynamic processes. However, each of these proposed methods suffers from inherent disadvantages. One such method is the Engel-Precht Process, in which the potassium sulfate in the spent seed is reacted with magnesium carbonate in the presence of carbon dioxide to form the magnesium carbonate potassium bicarbonate mixed salt hydrate which, in turn, is treated with magnesium oxide in the presence of water to form magnesium carbonate and regenerated potassium carbonate. There are certain advantages for the process, but the prior art also reveals many unacceptable disadvantages. For example, the reaction to provide potassium carbonate results in the disposal of one mole of magnesium sulfate for each mole of potassium sulfate regenerated. Further, conversion of potassium sulfate is low and potassium losses of approximately 40% can be expected. In addition, water pollution problems result from difficulties in removing magnesium sulfate and potassium sulfate from aqueous solutions because of their high solubilities.

Another prior art process proposed for use in regenerating spent potassium carbonate seed material is the double alkali process. In that process the potassium sulfate contaminant is reacted with calcium hydroxide to form potassium hydroxide and gypsum and the potassium hydroxide is, in turn, reacted with carbon dioxide to form potassium carbonate. In order for this process to proceed, extremely dilute solutions are required which necessitates large expenditures of energy to concentrate the aqueous solutions so that the potassium salts may be recovered.

In the formate process of U.S. Pat. No. 2,030,082, the potassium sulfate impurities are converted to potassium carbonate by reaction with carbon monoxide to form the formate salt which is then treated with oxygen. One disadvantage is that this process is complex and involves the use of complex apparatus because of the necessity that the carbon monoxide is free of carbon dioxide, and that carbon monoxide must be compressed to 30 to 35 atmospheres. A further disadvantage is that carbon monoxide utilization to generate the formate salt is unknown, and the high expense of oil and of natural gas required to generate carbon monoxide gas increases the cost of the process. Moreover, temperature control is critical to potassium salt lost in the double salts, and filtration problems exist because of the tendency of calcium sulfate to form gels.

Another procedure suggested for regeneration of spent seed materials is the PERC Process. In the PERC Process, the potassium sulfate impurities in the spent seed materials are reduced to potassium sulfide, which is then reacted with carbon monoxide and steam to produce potassium carbonate and hydrogen sulfide. While having one advantage in that the PERC Process is carried out in the solid and gaseous phases, it is very inefficient in that carbon monoxide gas utilization is less than three percent.

The aqueous carbonate and modified Tampella processes were developed for use with sodium and not potassium salts. However, it has been suggested that an analogous, modified version of these processes can be used in purifying potassium salts. Basically, in these modified processes potassium sulfate impurities are reacted with carbon at high temperatures to yield potassium sulfide which is reacted with carbon dioxide and water to form potassium carbonate and potassium bicarbonate. One disadvantage of these modified processes, is that they have not been fully modified for use in potassium salt recovery systems. Another disadvantage of these modified processes is that when they are employed in regenerating seed materials used in a magnetohydrodynamic power generating system where coal or coke is used as the reducing agent, potassium silicate and aluminate combustion product removal from potassium carbonate is difficult. A further disadvantage results from the presence of a liquid salt in the reduction vessel which causes serious materials problem.

The Markant Process has also been proposed for use in regenerating seed materials. In that process, potassium sulfate is heated with carbon forming potassium sulfide, which, in turn, is treated with zinc oxide in water to form potassium hydroxide. The potassium carbonate is then obtained by treating the corresponding hydroxide with carbon dioxide and water. One disadvantage of this process is that there are some indications that insufficient conversion of potassium sulfide to potassium hydroxide, and incomplete separation of zinc oxide and potassium salts will be a problem. Further, there are indications that potassium sulfide salts will be lost in the second step of the process, and that further potassium salts will be lost by reaction with impurities in ash constituents when coal or coke are carbon sources in the reduction step.

SUMMARY OF THE INVENTION

In accordance with this invention, there is provided a process for converting alkali metal sulfates into the corresponding alkali metal carbonate. The process of this invention comprises the steps of:

(a) introducing an aqueous solution comprising an alkali metal sulfate into the acid zone of an electrodialysis cell including one or more base zone and acid zone pairs arranged in alternating fashion between an anode and a cathode, said acid zone of each of said pairs being located between a cation face of a bipolar membrane and a face of a cation permselective membrane, and said base zone of each of said pairs being located between an anion face of said bipolar membrane and a face of a cation permselective membrane;

(b) introducing an aqueous solution comprising alkali metal bicarbonate, carbon dioxide, alkali metal carbonate or mixtures thereof into said base zone; and (c) passing direct current through said electrodialysis cell thereby producing alkali metal hydroxide or alkali carbonate or a mixture thereof in said base zone, and alkali metal bisulfate in said acid zone.

The alkali metal carbonate solution can be withdrawn from the base zone, and used in the solution form, or the alkali metal carbonate salt can be isolated in relatively pure form by conventional purification and isolation techniques, such as evaporation, crystallization, and the like. In a preferred embodiment of this invention, the alkali metal bisulfate solution is reacted with an alkaline earth metal carbonate, as for example calcium carbonate, forming carbon dioxide and the corresponding metal sulfate. The carbon dioxide is then added to the product of the base zone as described hereinabove, either in the gaseous state under pressure or as a solution under pressure.

As is apparent from the foregoing, the process of this invention is broadly useful for the preparation of alkali metal carbonates from the corresponding metal sulfates, or, in procedures for purifying alkali metal carbonates which are contaminated with an alkali metal sulfates. Thus, the process of this invention is especially useful for regenerating spent alkali metal carbonate seed materials, as for example, potassium carbonate, which has become contaminated with an alkali metal sulfate, as for example potassium sulfate, during the operation of magnetohydrodynamic processes.

DETAILED DESCRIPTION OF THE INVENTION

Figure 1:
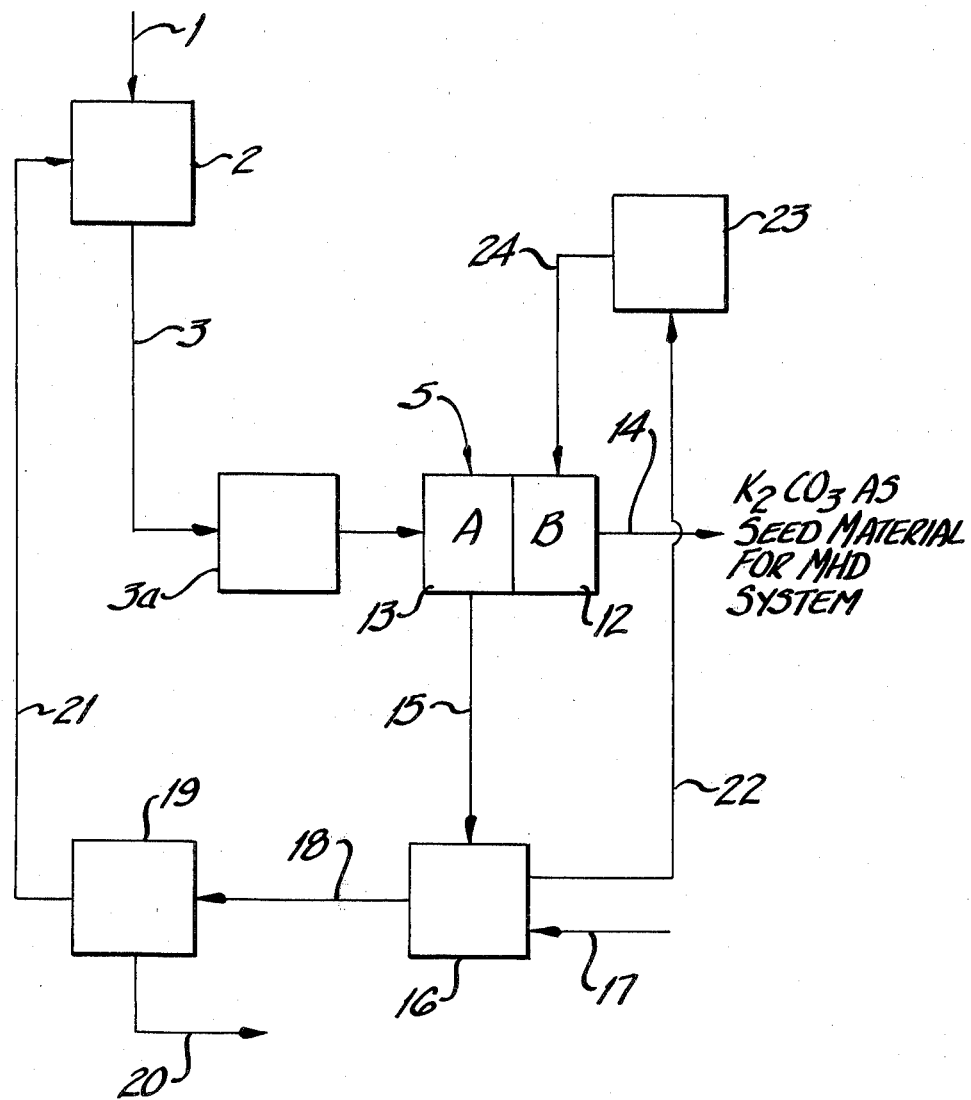
FIG. 1 is illustrative of a flow diagram of the process of the present invention employed in the regeneration of spent potassium carbonate seed material which has been contaminated with potassium sulfate during the operation of a magnetohydrodynamic power generating procedure.

The invention may be better understood by reference to the drawings. As shown in FIG. 1, fly ash, spent potassium carbonate and other impurities, such as zinc, iron, lead and phosphorus, collected from a magnetohydrodynamics power generating process is fed as stream 1 into a seed extraction unit 2. Various means are known in the prior art for collecting spent potassium carbonate seed material from magnetohydrodynamic power generating processes, any one of which can be used in conjunction with the process of this invention. For example, the procedure described in Petrick, M., and B. Ya Schumyatsky, eds., "Open-Cycle Magnetohydrodynamic Electrical Power Generating", a joint USA-/USSR Publication, Aronne National Laboratory, Illinois (1978) in which wet scrubbers have been used to remove entrained seed particles can be used. These prior art collection process including process variables such as process parameters, apparatus specifications, and the like are well known in the prior art, and will not be described herein in detail.

In seed extractor 2, mixed alkali metal salts, i.e. potassium sulfate, or mixtures of potassium sulfate and potassium carbonate in the collected seed is separated from coal ash and certain other impurities. Any method or process known in the prior art for extracting potassium salts from fly ash in which water soluble potassium salts are provided can be employed. Various useful procedures, which include hot aqueous digestion with calcium hydroxide, acid wash, and aqueous extraction, have been proposed as seed extraction procedures. In the hot aqueous digesting procedure, which is described in more detail in Kahna, T., and NC Nahos, "Exxon Catalytic Coal Gasification Process Predevelopment Program", final project report, Fe-2369-24, Exxon Research and Engineering Company, Baytown, Texas, (December, 1978), the collected seed is digested with calcium hydroxide under 480 kPa pressure at 423 K.

temperatures and to recover the potassium salts as water soluble salts. In the acid wash procedure, which is also described in more detail in Kalina et al., the collected seed is acidified with sulfuric acid or hydrochloric acid forming the potassium sulfate, and chloride salts, respectively, then treated with potassium hydroxide which precipitates undesirable cations, as for example aluminum, silicon, and iron. In the aqueous extraction procedure which is described in detail in Bienstack, D., et al., "Air Pollution Aspects of MHD Power Generation", 13th Symposium on Engineering Aspects of Magnetohydrodynamics, Stanford University, (March 1973), the potassium salts are recovered in solution by boiling spent seed in water for long periods of time. The potassium salts, which as shown hereinabove are extracted as the carbonate, sulfate or chloride salts or mixtures thereof are fed as stream 3 into acid feed tank 3(a) where it is held until it is fed into the acid zone 13 of electrodialysis cell 5. In the preferred embodiments of this invention, the potassium salts will be extracted as the potassium carbonate and sulfate salts and introduced into electrodialysis cell 5.

Figure 2:
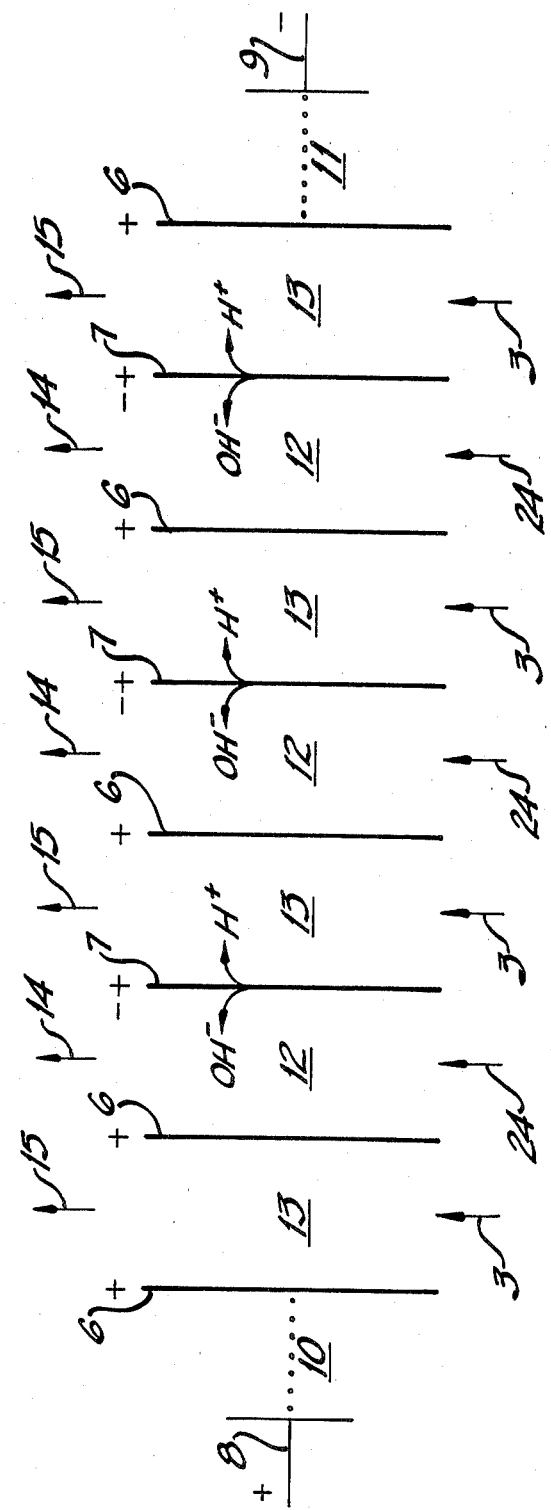
FIG. 2 is a schematic diagram of a electrodialysis cell for use in the conduct of the process of this invention.

The electrodialytic procedure may be better understood by reference to FIG. 2, which is a schematic diagram of an electrodialysis assembly which can be used in the conduct of the process of this invention. The assembly shown in FIG. 2 comprises nine compartments which incorporate a plurality of cation permselective membranes 6, and bipolar membranes 7, arranged in alternating fashion between an anode 8 and a cathode 9. For convenience the assembly shown in FIG. 2 contains only three acid/base zone pairs. However, in practice the assembly may contain up to several hundred or more of such pairs where greater capacity is desired. Anode 8, which is usually platinum, dimensionably stable anode manufactured by Electrode Corp. or like metal is located in an anolyte compartment 10 immersed in an anolyte such as an aqueous solution of potassium sulfate. The cathode 9 which may be platinum, stainless steel, graphite, or other material known in the art is located in a catholyte compartment 11 immersed in a catholyte which may also be aqueous potassium sulfate. The anolyte and catholyte are usually the same solution. The cathode 9 and anode 8 are connected to a suitable direct current source.

The plurality of membranes 6 and 7 divide the assembly into a plurality of alternating base compartments or zones 12 and acid compartments or zones 13. Each base zone 12 is bounded by a cation permselective membrane 6 and an anion face of a bipolar ion exchange membrane 7, and each acid zone 13 is bounded by a cation face of a bipolar ion exchange membrane 7 and a cation permselective membrane 6.

Useful electrodialytic assemblies can be manufactured or fabricated in accordance with known techniques and using cation permselective and bipolar ion exchange membranes known to those of skill in the art and accordingly will not be described herein in detail.

Electrodialysis assemblies useful in the conduct of the process of this invention are readily available from commercial sources. For example, useful units are available commercially from Asahi Glass Company, 1-2 Marunochi 2-chome, chiyoda-ku, Tokyo, Japan, Ionics, Inc. Watertown, Massachusetts; and from other commercial sources.

The cation permselective ion exchange membranes which are useful in the conduct of the process of this invention have strongly acidic groups, such as sulfonic acid groups, chemically bonded to an inert polymeric matrix. The specific cation membrane chosen for use is not critical, provided that it has high permeability for cations, and prevents passage of anions; and has adequate mechanical strength. Cation permselective membranes preferred for use in this invention are Selemion CMV manufactured by Asahi Glass Co., Neosepta CL-25T and C66-5T manufactured by Tokuyoma Soda, Nafion manufactured by DuPont, MC 3470 manufactured by Ionac Chemical or CR-61 manufactured by Ionics, Aciplex CK-1 manufactured by Asahi Chemical Industries particularly preferred cation permselective membranes are CMV and CL-25T.

The type of bipolar membrane employed in the conduct of this invention is also not critical, and any membranes or groups of membranes, or other structure can be employed which effectively convert water into hydrogen ions ($H^+$) and hydroxyl ions ($OH^-$), or are useful in water splitting. Thus, as used herein, "bipolar membrane", refers to any structure which can perform the above described function in an electrodialysis cell. Illustrative of useful bipolar membranes are those described in detail in U.S. Pat. No. 2,829,095, which relates to water splitting generally, U.S. Pat. No. 4,253,900 and the single film or cast bipolar membranes described in U.S. Pat. Nos. 4,024,643; 4,140,815; and 4,116,889, all of which are incorporated herein by reference. Bipolar membranes preferred for use in the practice of this invention are those described in U.S. Pat. Nos. 4,024,643, 4,140,815 and 4,116,889; and particularly preferred membranes are those described in U.S. Pat. No. 4,116,889.

While the use of classical bipolar membranes are to be preferred because of simplicity of equipment. The water splitting operation may be carried out by using other structures which can provide the water splitting function. For example, the operation can be conveniently carried out by using a third compartment in conjunction with a monopolar membrane, as described for example in U.S. Pat. Nos. 3,704,218 and 3,705,846, which are hereby incorporated by reference. The structure consists of an anion permselective membrane and cation permselective membrane and a separate compartment therebetween; together these three components form a bipolar module. The compartment contains an electrolyte solution which cannot pass through, clog or coat the membranes, e.g., an aqueous solution of polystyrene sulfonic acid. This polyfunctional electrolyte cannot migrate through the pores of the membranes because of the large size of the polystyrene molecules and the relatively small size of the pores of the membranes. Polyfunctional bases, e.g., polyvinylbenzyltrimethylammonium sulfate may also be used as the electrolyte in this compartment.

The operation of the electrodialytic unit 5 is essentially as follows: A direct current is passed from anode 8 to cathode 9. Stream 3 which contains an alkali metal salt, such as potassium sulfate, potassium chloride or mixtures of such salts and potassium carbonate is fed into acid compartments or zones 13 from acid feed tank 3(a). In the preferred embodiments of this invention stream 3 is a dilute aqueous solution containing from about 0.01 to about 5.0 weight percent potassium carbonate and from about 0.1 to about 10 weight percent potassium sulfate. An aqueous solution containing from about 2 to about 40 weight percent $K_2CO_3$ is circulated in the base compartments or zones 12. Carbon dioxide can be bubbled directly into base zones 12, preferable under pressure, or added to the base solution external to the cell.

In acid zones 13, hydrogen ions (H+), from bipolar membrane 7 are introduced. Simultaneously alkali metal cations, i.e. K+, Na+ and the like, migrate through cation permselective membrane 6 into base zone 12. In acid zone 13, hydrogen ions (H+) convert sulfate ions ($SO_4^{-2}$), into bisulfate ($HSO_4^-$) ions, which in turn, can be further converted by another hydrogen ion (H+) into sulfuric acid ($H_2SO_4$).

The degree of conversion is determined by the rate at which fresh $K_2SO_4$ is added to the acid system and the rate at which acid is withdrawn for reaction with $CaCO_3$. The rates should be adjusted so as to give a fairly low flow through the $CaCO_3$ reactor and a small recycle of $K_2SO_4$ but the conversion must not be carried too far as the current efficiency in the water splitter decreases as a function of conversion because of the transport of H+ through the cation membranes.

As was indicated hereinabove, in the preferred embodiments of this invention an aqueous solution of the alkali metal carbonate and alkali metal sulfate is introduced into acid zones 13. The presence of the carbonate ions ($CO_3^=$) provides a side reaction which can be used as a source of carbon dioxide, for introduction into the base zone 12. As hydrogen ions (H+) are introduced into the acid zone 13, they will first react with carbonate ions ($CO_3^=$) and not sulfate ions ($SO_4^=$) because of differences in basicity. Thus, the hydrogen ions (H+) ions will convert carbonate ions ($CO_3^=$) to bicarbonate ions ($HCO_3^-$), which in turn, are converted to carbonic acid ($H_2CO_3$). The carbonic acid ($H_2CO_3$) converts to $H_2O$ and $CO_2$ which can be introduced into the base zone or into base feed tank-external of the base zone.

These conversion steps are depicted schematically in the following reaction scheme wherein M is alkali metal cations, i.e., K+, Na+, Cs+;

$M_2CO_3 = 2M(aq) + CO_3^=(aq)$      (a)

$H^+ + CO_3^= = HCO_3^-$      (b)

$HCO_3^- + H^+ = H_2CO_3$      (c)

$H_2CO_3 = H_2O + CO_2(g)$      (d)

As shown in FIG. 1, the carbon dioxide gas/carbonic acid mixture so produced can be removed from acid zones 13, and introduced into base zones 12 as stream 24 wherein the carbon dioxide is converted to the alkali metal carbonate as described hereinabove.

As can be seen from FIG. 1, carbon dioxide in water, either alone or in combination with an alkali metal carbonate and an alkali metal bicarbonate is fed from base feed tank 23 into base zones 12 as stream 24. The electrodialytic cell 5 is operated and in base zones 12, hydroxyl ions (OH−) are introduced. The hydroxyl ions convert carbonic acid ($H_2CO_3$) to bicarbonate ions ($HCO_3^-$). The bicarbonate ions associate with alkali metal ions from acid zones 13, forming the alkali metal bicarbonate, i.e. $KHCO_3$, $NaHCO_3$ and the like. Continued introduction of hydroxyl ions (OH−) convert bicarbonate ions ($HCO_3^-$) into carbonate ions ($CO_3^=$) which when associate with alkali metal ions forming the desired alkali metal carbonate, i.e. $K_2CO_3$, $Na_2CO_3$, and the like. Further conversion leads to alkali metal hydroxide which may be reacted with $CO_2$ to form carbonate.

The current in the assembly is transported by migrating solvated cations and anions. The above described conversion may be made in a single pass through the assembly, or the solutions may be subjected to multiple applications of the electrodialysis procedure. Thus, as is apparent from FIG. 2, the electrodialysis procedure is designed so that alkali metal ions and hydroxyl ions are allowed to migrate to base zone 12 under the influence of applied electric potential where the hydroxyl ions react with solvated carbon dioxide forming carbonate ions. Both the alkali metal ions and the carbonate ions are constrained from migrating out of base compartment or zone 12 by virtue of the ion selective membrane 6 and applied potential.

The reaction in the electrodialysis unit can be schematically represented by the following reaction schemes in which "M" is as defined hereinabove:

Acid Compartment $M_2SO_4 = 2M^+ + SO_4^=$
$H^+ + SO_4^= = {}^-HSO_4^-$
$H^+ + {}^-HSO_4 = H_2SO_4$ Base Compartment $^-OH + H_2CO_3 = H_2O + {}^-HCO_3$
$^-OH + {}^-HCO_3 = H_2O + CO_3^=$
$2M^+ + CO_3^= = M_2CO_3(aq)$ The overall results of the electrodialysis step is that concentration of the alkali metal carbonate in base zones or compartments 12 is increased. After the various reaction have gone to completion, the product solution of each base zone 12 is drawn off by conventional means as for example an overflow valve or piping system, as stream 14. The product solution which preferably contains from about 2 to about 60 and most preferably about 15 to about 40 weight percent of the alkali metal carbonate can be stored or the carbonate isolated in relatively pure form by conventional techniques, as for example evaporation, crystallization, and the like. One preferred method of isolation is to load the product solution with a crystallizing agent, such as ammonia, methanol, ethanol and the like which causes the alkali metal salt to crystallize out of solution.

The product solution of the acid zone 13, which can contain alkali metal ions, sulfate ions, bisulfate ions, sulfuric acid and anionic impurities, is removed from acid zone 13 as stream 15. The product can be isolated, collected and stored for later disposal. However, as shown in FIG. 1, alternatively and preferably, the product solution can be introduced into reactor 16 for reaction with an alkaline earth metal carbonate, preferably calcium carbonate, which is introduced into reactor 16 as stream 17. The bisulfate and sulfuric acid components of the product solution of acid zones 13 react with the alkaline earth metal carbonate to produce carbon dioxide and the corresponding alkaline earth metal sulfate in accordance with the following reaction scheme in which $M^{+2}$ is an alkaline earth metal cation:

$H_2SO_4 = 2H^+ + SO_4^{-2}$      (a)

$HSO_4^- = H^+ + SO_4^{-2}$      (b)

$6H^+ + 3MCO_3 = 3H_2CO_3 + 3M^{+2}$      (c)

$3M^{+2} + 3SO_4^{-2} = 3MSO_4$      (d)

$3H_2CO_3 = 3H_2O + 3CO_2(g)$      (e)

As shown in FIG. 1, the carbon dioxide gaseous product is removed from reactor 16, and introduced into base feed tank 23 where it is dissolved in an aqueous medium and is then fed into base zone 12 of electrodialytic cell 5 as stream 24 where it is converted into the alkali metal carbonate as described hereinabove.

In the preferred embodiments of this invention, the alkaline earth metal sulfate product ($MSO_4$), is essentially water insoluble, such as calcium sulate. In this preferred embodiment a mixture of the solid carbonate precipitate, and the aqueous solution containing unconverted potassium sulfate, is removed from reactor 16 by way of stream 18 and is introduced into settler 19 where the liquid and solid phases are allowed to separate. The solid water insoluble alkaline earth metal sulfate salt is removed from settler 19 as stream 20 for disposal or other uses. The solution of unconverted alkali metal sulfate is removed from settler 19 as stream 21, and is introduced into seed extractor 2 for recycling in the electrodialysis procedure of this invention.

The invention will be further illustrated by reference to the following examples, the details of which should not be construed as limiting the invention.

EXAMPLE I

Conversion of $Na_2SO_4$ To Bisulfates By Water Splitting

The electrodialytic cell consisted of an anode, anode compartment, Tokuyama Soda CL25T Cation membrane, acid compartment, CL-25T, Base compartment, Bipolar membrane, Acid compartment, CL-25T, Cathode compartment and cathode as shown and was of the type show schematically in FIG. 2, hereinbelow.

The exposed area of each membrane was 11 cm$^2$. The following solutions were circulated through the cell. Into each of the anode and cathode compartments, was fed 1 l of 0.5 M $H_2SO_4$. Into both acid compartments, was fed 500 mL of 0.5 M $Na_2SO_4$ and into the base compartment was fed 150 mL of 0.5 M $Na_2S_4$. A direct current of 1.00 amperes was passed through the cell and 10 mL portions of 0.9641 N $H_2SO_4$ were added to the base compartment each time the pH reached 7. The time that it takes the acid add to the base zone to reach pH 7 is a measure of the efficiency of the system for generating acid and base. Samples of the acid were taken periodically and titrated for hydrogen ion ($H^+$) and analyzed for sulfate ion ($SO_4^=$). The results are set forth in Tables I and II hereinbelow.

TABLE I

Current Efficiency in $Na_2SO_4/NaHSO_4$ System

| time (sec) | time to neutralize acid added to base (sec) | current efficiency |
|---|---|---|
| 1014 | 1014 | .918 |
| 2046 | 1032 | .902 |
| 3132 | 1086 | .857 |
| 4267 | 1135 | .820 |
| 5487 | 1220 | .763 |
| 6800 | 1313 | .709 |
| 8223 | 1423 | .654 |
| 9797 | 1574 | .591 |
| 11575 | 1778 | .523 |
| 13657 | 2082 | .447 |
| 16213 | 2556 | .364 |

TABLE II

Analysis of Acid Samples in $Na_2SO_4/NaHSO_4$ System

| time (sec) | [$H^+$] | [$SO_4^=$] |
|---|---|---|
| 1150 | .0600 | .496 |
| 2950 | .1313 | — |
| 4750 | .2014 | — |
| 6650 | .2710 | .497 |
| 8350 | .3319 | — |
| 10150 | .3892 | .497 |
| 11950 | .4489 | — |
| 13750 | .5020 | — |
| 15550 | .5489 | .508 |

EXAMPLE II

Conversion of $K_2SO_4$ To Bisulfates

An experiment was conducted employing the procedure and electrodialysis cell of Example I, except that $K_2SO_4$ was substituted for $Na_2SO_4$. The results of this experiment are set forth in the following Tables III and IV.

TABLE III

Current efficiency in $K_2SO_4/KHSO_4$ system

| time (sec) | time to neutralize acid added to base (sec) | current efficiency |
|---|---|---|
| 973 | 973 | .956 |
| 1982 | 1009 | .922 |
| 3023 | 1041 | .894 |
| 4093 | 1070 | .869 |
| 5200 | 1107 | .840 |
| 6350 | 1150 | .809 |
| 7560 | 1210 | .769 |
| 8835 | 1275 | .730 |
| 10208 | 1373 | .678 |
| 11700 | 1492 | .624 |
| 13348 | 1648 | .565 |
| 15171 | 1823 | .510 |
| 17290 | 2119 | .439 |

TABLE IV

Analysis of Acid in $K_2SO_4/KHSO_4$ system

| time (sec) | [$H^+$] | [$SO_4^=$] |
|---|---|---|
| 200 | .0279 | 0.499 |
| 2000 | .0923 | — |
| 3800 | .1483 | — |
| 5600 | .2071 | — |
| 7400 | .2629 | — |
| 9200 | .3198 | — |
| 11000 | .3744 | — |
| 12800 | .4254 | — |
| 14600 | .4753 | 0.524 |
| 16400 | .5196 | — |

EXAMPLE III

Figure 3:
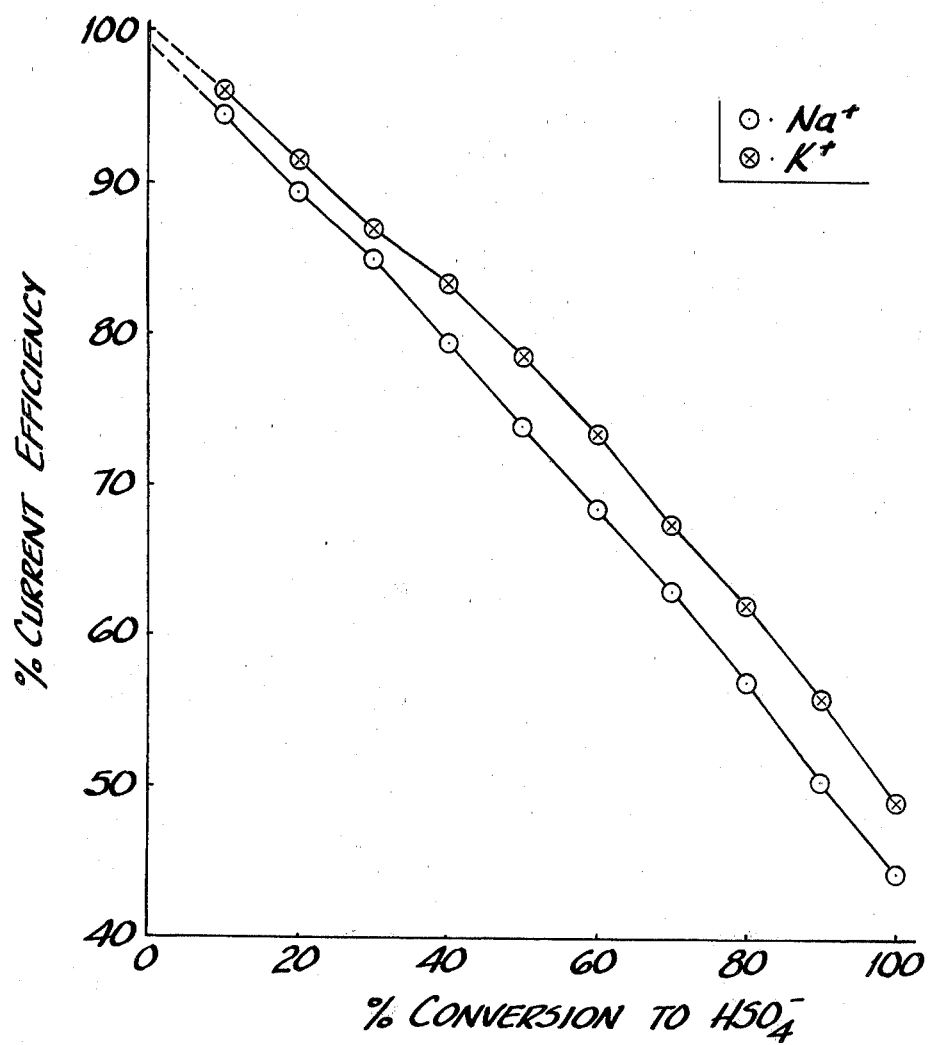
FIG. 3 is a graph of the efficiency of generating bisulfate ions ($HSO_4^-$) as a function of conversion of sulfate ions ($SO_4^=$) to bisulfate ions ($HSO_4^-$).

Employing conventional techniques, the data set forth in Tables I and IV hereinabove were utilized to derive the efficiencies of acid/base generation, as a function of conversion of sulfate to bisulfate in the sodium ion ($Na^+$) and potassium ion ($K^+$) systems. The results of these derivations are set forth graphically in FIG. 3, and in Table V hereinbelow:

TABLE V

Current Efficiency as a function of conversion of $SO_4^=$ to $HSO_4^-$ from Tables I–IV

| % Conversion | $Na_2SO_4$ | $K_2SO_4$ |
|---|---|---|
| 10 | .945 | .960 |
| 20 | .895 | .915 |
| 30 | .850 | .870 |

TABLE V-continued

Current Efficiency as a function of conversion of $SO_4^=$ to $HSO_4^-$ from Tables I–IV

| % Conversion | $Na_2SO_4$ | $K_2SO_4$ |
|---|---|---|
| 40 | .795 | .835 |
| 50 | .740 | .785 |
| 60 | .685 | .735 |
| 70 | .630 | .675 |
| 80 | .570 | .620 |
| 90 | .505 | .560 |
| 100 | .445 | .490 |

EXAMPLE III

Conversion of $K_2SO_4$ to $K_2CO_3$ and $KHSO_4$

The cell used was similar in arrangement to that of Example 1. The cell was charged with the following solutions: Anode and Cathode compartments—1 liter of 0.5 M $K_2SO_4$, Acid compartments—1 liter of 0.5 M $K_2SO_4$, Base compartment—161.9 mL of 0.011 M $K_2CO_3$. The solutions were circulated through the cell while a direct current of 1.2 amperes was passed for a total of 15000 sec. During the passage of current, $CO_2$ gas was admitted to the base compartment at such a rate as to maintain a pH of about 9. The final pH of the base compartment was 9.2, the volume was 170.0 mL and the concentration of $K_2CO_3$ was 0.447 M. The current efficiency for $K_2CO_3$ generation was thus 85%. The acid compartment feed had been partially converted to $KHSO_4$ during the experiment. The $HSO_4^-$ concentration in the acid at the conclusion of current passage was 0.168 M.

EXAMPLE IV

The conversion of $K_2SO_4/KHSO_4$ to carbon dioxide and a solution of $K_2SO_4$ by reaction with $CaCO_3$ A 500 mL solution which was 0.142 M $KHSO_4$ and 0.154 M $K_2SO_4$ was stirred for ½ hr. at 55° with 9.0 g of $CaCO_3$, carbon dioxide ($CO_2$) gas was evolved. The final pH of the mixture was 7.4. The mixture was allowed to settle and 100 mL of the clear supernatant was evaporated to dryness to give a residue of 4.11 g. The residue was redissolved and treated with 3 mL of 1 M $K_2CO_3$. A precipitate of 0.08 g $CaCO_3$ was recovered corresponding to 0.14 g of $CaSO_4.2H_2O$ in the original residue. The potassium was thus completely recovered in the supernatant. Concentration of $K_2SO_4$ in the product solution of more than about 4% results in the formation of the double salt $K_2SO_4.CaSO_4.H_2O$ and loss of potassium in the precipitate.

Certain representative embodiments of the present invention have been presented for the purpose of more particularly illustrating the invention. It will be apparent to those of skill in the art that various changes and modifications may be made therein without departing from the scope and spirit of the invention.

What is claimed is:

1. A process for converting alkali metal sulfate compounds into the corresponding metal carbonate which comprises the steps of:
(a) introducing an aqueous solution comprising an alkali metal sulfate into the acid zone of an electrodialysis cell including one or more acid and base zone pairs, arranged in alternating fashion between an anode and a cathode, said acid zone of each of said pairs being located between a cation face of a bipolar membrane and a face of a cation permselective membrane, and said base zone of each of said pairs being located between an anion face of said bipolar membrane and a face of a cation permselective membrane;
(b) introducing an aqueous solution comprising carbon dioxide, an alkali metal carbonate, alkali metal bicarbonate or a mixture thereof into said base zone; and
(c) passing direct current through said electrodialysis cell thereby producing an aqueous solution comprising an alkali metal carbonate in said base zone, and an aqueous solution comprising an alkali metal bisulfate or sulfuric acid in said acid zone.

2. A process according to claim 1 which further comprises withdrawing said aqueous solutions from each of said acid zone and said base zones.

3. A process according to claim 1 wherein said aqueous solution of step (a) comprises a mixture of an alkali metal sulfate and an alkali metal carbonate.

4. A process according to claim 3 wherein said alkali metal is sodium or potassium.

5. A process according to claim 4 wherein said alkali metal is potassium.

6. A process according to claim 1 wherein said aqueous solution of step (a) comprises potassium sulfate, or a mixture of potassium sulfate and potassium carbonate.

7. In an improved process for converting spent seed from a magnetohydrodynamic power generating process, said seed comprising potassim sulfate, or a mixture of potassium sulfate and potassium carbonate, said improvement comprising the steps of:
(a) introducing an aqueous solution comprising said spent seed into the acid zone of an electrodialysis cell including one or more acid zone and base zone pairs, each of said pairs positioned between an anode and a cathode such that said acid zones and said base zones are arranged in alternating fashion, said acid zone of each of said pairs being located between a cation face of a bipolar membrane and a face of a cation permselective membrane, and said base zone of each of said pairs being located between an anion face of said bipolar membrane and a face of a cation permselective membrane;
(b) introducing an aqueous solution comprising potassium carbonate in said base zone; and
(c) passing direct current through said cell producing a potassium carbonate enriched solution in said base zone.

8. The improvement according to claim 7 which further comprises withdrawing said potassium carbonate enriched solution from said base zone.

9. The improvement according to claim 8 wherein the potassium carbonate concentration in said enriched solution is from about 15 to about 40 weight percent based on the total weight of said solution.

10. The improvement according to claim 7 wherein said spent seed comprises a mixture of potassium carbonate and potassium sulfate.

11. The improvement according to claim 10 which further comprises introducing into said base zone carbon dioxide gas formed in said acid zone from carbonate ions ($CO_3^{-2}$) when direct current is passed through said cell.

12. The improvement according to claim 10 wherein the potassium carbonate content of said aqueous solution introduced in said acid zone in step (a) is in the range of from about 0.01 to about 5 weight percent, and the potassium sulfate content of said solution is in the range of from about 0.1 to about 10 weight percent, based on the total weight of the solution.

13. The improvement according to claim 1 or 7 which further comprises withdrawing the product solution of said acid and base zone.

14. The improvement according to claim 13 wherein said acid zone product solution comprises potassium sulfate and potassium bisulfate.

15. The improvement according to claim 14 which further comprises contacting said product solution with an alkaline earth metal carbonate of the type which forms carbon dioxide gas by reaction with potassium bisulfate for a time and under conditions sufficient to form carbon dioxide; and introducing said carbon dioxide gas into the base zone of said cell.

16. The improvement according to claim 15 wherein said alkaline earth metal carbonate is of the type which reacts with potassium bisulfate in the aqueous phase to form carbon dioxide and an alkaline earth metal sulfate which is substantially water insoluble.

17. The improvement according to claim 16 wherein said alkaline earth metal carbonate is calcium carbonate.

18. The improvement according to claim 16 which further comprises separating said substantially water insoluble alkaline earth metal sulfate from said aqueous solution; and introducing said solution into the seed extractor.

* * * * *